United States Patent [19]

Shilling et al.

[11] 3,985,045

[45] Oct. 12, 1976

[54] LOCKING DEVICE FOR A DIFFERENTIAL DRIVE MECHANISM

[75] Inventors: John P. Shilling; Derold L. Sherrill, both of Marshall, Mich.

[73] Assignee: Eaton Corporation, Cleveland, Ohio

[22] Filed: Jan. 17, 1975

[21] Appl. No.: 541,816

[52] U.S. Cl. ............................................. 74/711
[51] Int. Cl.² ....................................... F16H 1/44
[58] Field of Search ........................ 74/710.5, 711

[56] References Cited
UNITED STATES PATENTS

| | | | |
|---|---|---|---|
| 3,606,803 | 9/1971 | Ottemann | 74/711 |
| 3,818,781 | 6/1974 | Goscenski, Jr. | 74/711 |
| 3,831,462 | 8/1974 | Baremor | 74/711 |
| 3,845,672 | 11/1974 | Goscenski, Jr. | 74/711 |

*Primary Examiner*—Samuel Scott
*Assistant Examiner*—Wesley S. Ratliff, Jr.
*Attorney, Agent, or Firm*—Teagno & Toddy

[57] ABSTRACT

An improved differential drive mechanism includes a clutch which is engageable to retard relative rotation between driving and driven members. A clutch actuator assembly includes a pair of flyweights which are rotated about a central axis of the actuator assembly at a speed which varies as a function of the speed of relative rotation between the driving and driven members. Upon the occurrence of a predetermined rate of relative rotation between the driving and driven members, one of the flyweights moves outwardly from a retracted position to an extended position in which it engages a stop element and initiates actuation of the clutch. In order to promote engagement of a stop surface on the flyweight with the stop element and locking up of the differential upon movement of the flyweight to the extended position, the distance which the stop surface projects outwardly is maximized for a given extent of angular movement of the flyweight between the retracted and extended positions.

16 Claims, 7 Drawing Figures

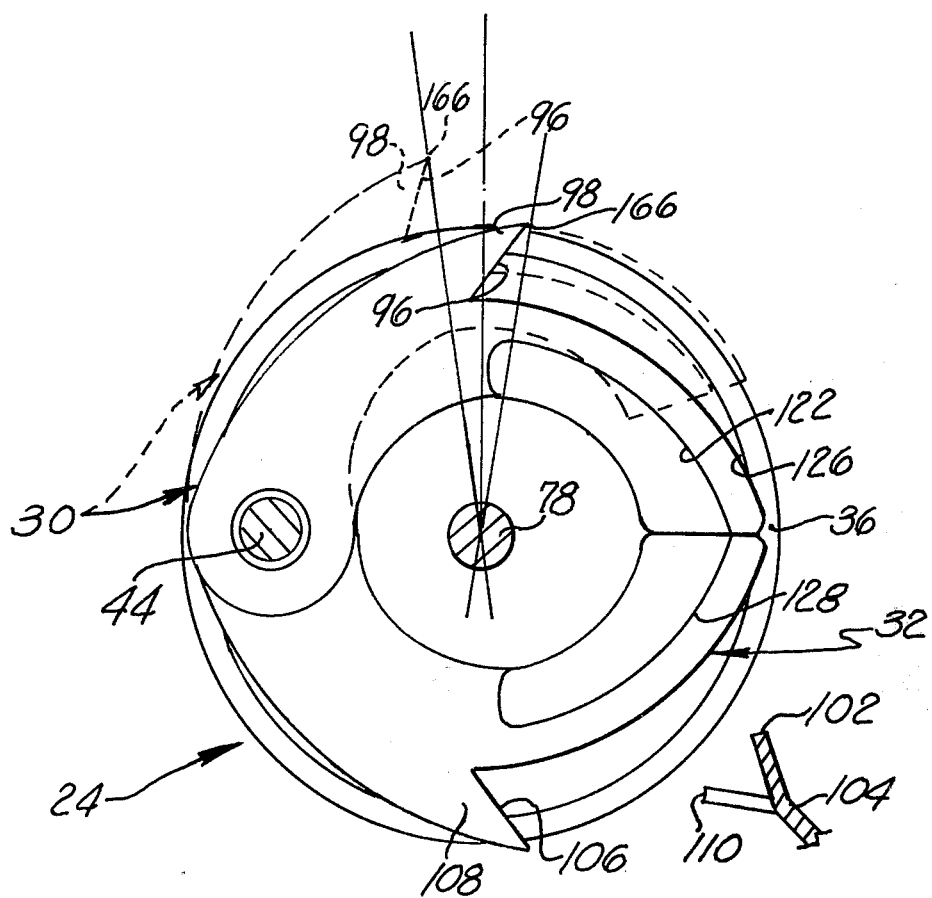
FIG. 4
FIG. 5
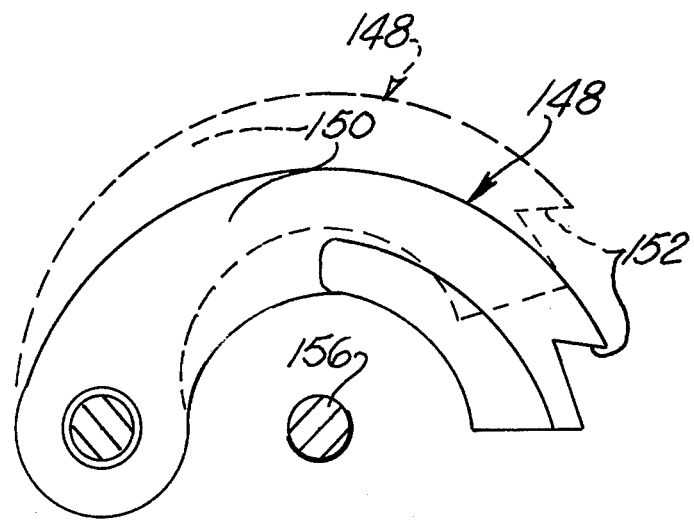
(PRIOR ART)

IMPROVED LOCKING DEVICE FOR A DIFFERENTIAL DRIVE MECHANISM

BACKGROUND OF THE INVENTION

This invention relates generally to a drive mechanism and more specifically to a drive mechanism having a clutch actuator assembly which responds to relative rotation between driving and driven members.

Known differential drive mechanisms having clutch assemblies which are actuated in response to relative rotation between driving and driven members are disclosed in U.S. Pat. No. 3,606,803 to Ottemann and in U.S. Pat. No. 3,845,672 to Goscenski. The differential disclosed in the Ottemann patent includes an actuator assembly having a pair of flyweights. A drive arrangement rotates the flyweights about a central axis of the actuator assembly to subject the flyweights to forces which vary as a function of the degree of relative rotation between the driving and driven members. Upon the occurrence of a predetermined degree of relative rotation, an active one of the flyweights will move outwardly under the influence of centrifugal force and engage a stop element to initiate operation of a clutch assembly to an engaged condition.

Although the aforementioned differential is generally satisfactory, lock-ups are occasionally missed. It was thought that a missed lock-up resulted from the fact that as the active one of the two flyweights moved outwardly, the inactive flyweight also moved outwardly and banged against the stop element to force it out of the way of the active flyweight with a resulting failure to lock-up. To substantiate this theory, the inactive flyweight was held in place and the stop surface on this flyweight was rounded off to render the inactive flyweight ineffective. Even in this condition, lock-ups were still occasionally missed. After considerable experimentation, it was determined that a stop surface located at or near the end of the flyweight would not move outwardly through a distance sufficient to engage the stop element. This defect could be remedied by increasing the angular distance through which the active flyweight pivoted outwardly as it moved from its retracted position to its extended position. However, space within known differential is very limited and increasing the angular distance through which the flyweight moves would result in interference with other components of the differential.

SUMMARY OF THE PRESENT INVENTION

Accordingly, it is an object of this invention to provide a flyweight for the aforesaid differential which will maximize the possibility for a differential lock-up for a given occurrence with a minimal amount of angular movement of the flyweight.

The present invention provides a flyweight of a configuration which maximizes the extent to which the stop surface on the flyweight projects outwardly from the central axis about which the flyweight is rotated when it is in the extended position. Thus, for an actuator assembly of a given size when the flyweights are retracted and a given angular distance between the retracted and extended flyweight positions, the stop surface on the extended flyweight projects as far out as possible from the central axis about which the extended flyweight is rotated. Of course, this promotes engagement of the stop surface on the extended flyweight with the element which initiates actuation of the clutch assembly to effect a lock-up of the differential.

In order to maximize the extent to which the outermost end of the stop surface on the flyweight projects outwardly when the flyweight is in the extended position, the stop surface is accurately located in an optimum position on the body of the flyweight. When the stop surface is in the optimum position on the body of the retracted flyweight, the flyweight is disposed within a first imaginary circle which intersects the outermost end of the stop surface and has a center which is located on the central axis of rotation of the actuator assembly. Upon movement of the flyweight to the extended position, the outermost end of the stop surface on the flyweight is intersected by a second imaginary circle which is disposed in the same position relative to the extended flyweight as is the first imaginary circle relative to the retracted flyweight. The second imaginary circle has a diameter which is the same as the diameter of the first imaginary circle. The angular distance through which the flyweight is moved between the extended and retracted positions and the position of the stop surface on the body of the flyweight are related to each other in such a manner that the intersection of the outermost end of the stop surface on the extended flyweight and the second imaginary circle is located at a point which is disposed further from the central axis of the actuator assembly than any other point on the second imaginary circle.

BRIEF DESCRIPTION OF THE DRAWINGS

The foregoing and other objects and features of the present invention will become more apparent upon consideration of the following description taken in connection with the accompanying drawings wherein:

FIG. 4 is a sectional view, taken generally along the line 4—4 of FIG. 2, illustrating the relationship between a pair of flyweights in the actuator assembly, the flyweights being shown in their retracted positions, one of the flyweights being shown in dashed lines in its extended position;

FIG. 5 is an enlarged side view of a known flyweight used in a prior art differential drive mechanism of a construction generally similar to the construction of the differential drive mechanism of FIG. 1, the known flyweight being shown in solid lines in its retracted position and in dashed lines in its extended position;

DESCRIPTION OF ONE SPECIFIC PREFERRED EMBODIMENT OF THE INVENTION

Figure 1:
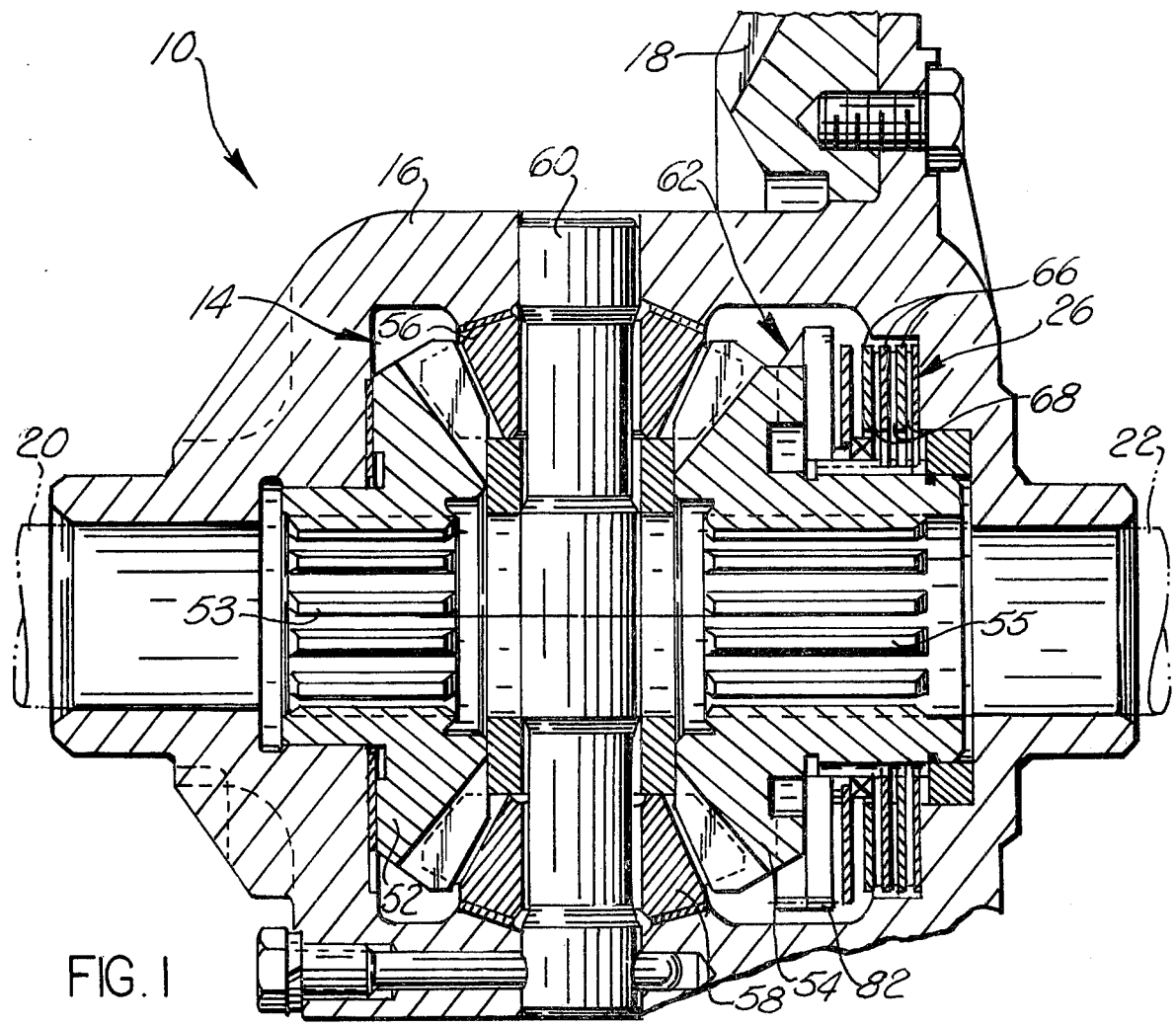
FIG. 1 is a sectional view of a differential drive mechanism having a clutch assembly which is operable from a disengaged condition to an engaged condition to retard relative rotation between driving and driven members.

A differential drive mechanism 10 constructed in accordance with the present invention is illustrated in FIG. 1 and includes differential gearing 14 which is enclosed within a casing 16 to drivingly connect an annular input member 18 with a pair of driven output members 20 and 22. In the illustrated embodiment of the invention, driven members 20 and 22 are connected with the rear wheels of a vehicle. Upon the occurrence of a predetermined rate of rotation of one driven member 20 or 22 relative to input member 18, an actuator assembly 24 (see FIGS. 2–4) effects operation of a main clutch assembly 26 (FIG. 1) to an engaged condition to retard relative rotation between input member 18 and driven members 20 and 22.

Actuator assembly 24 includes a pair of identical flyweights 30 and 32 which are urged to the retracted position shown in solid lines in FIG. 4 by biasing spring (not shown). A pair of cup-shaped stop members 36 and 38 (see FIGS. 2 and 4) are provided to limit outward movement of flyweights 30 and 32 so that they do not interfere with other portions of the drive mechanism and to limit the loading on pivot connections 40 and 42 (see FIG. 2) between the cup-shaped stop members and a support shaft 44 (see FIG. 4) for the flyweights.

During operation of differential 10, input member 18 is rotated by a prime mover (not shown). Rotation of imput member 18 drives casing 16 to rotate a cross-shaft 60 about the central axis of driven members 20 and 22. Assuming that driven members 20 and 22 are being rotated at the same angular velocity, drive forces are transmitted from casing 16 to a pair of side gears 52 and 54 by pinion gears 56 and 58 which are connected with casing 16 by cross-shaft 60. Side gears 52 and 54 are connected with driven members 20 and 22 by splined connections 53 and 55. If desired, spline connections 53 and 55 could be eliminated and side gears 52 and 54 could be integrally formed with driven members 20 and 22.

Upon rotation of one driven member 20 or 22 relative to the other driven member as in a slipping wheel condition, the associated side gear 52 or 54 is accelerated relative to the other side gear. When this occurs, the actuator assembly 24 engages main clutch assembly 26 (FIG. 1) by retarding rotation of an annular wedge member 62 relative to casing 16. Retarding rotation of wedge member 62 relative to casing 16 causes an annular undulating cam surface formed on side gear 54 to press wedge member 62 toward the right (as viewed in FIG. 1). This rightward movement of wedge member 62 presses a plurality of annular friction discs 66 connected with casing 16 against a plurality of annular friction discs 68 connected with side gear 54 in the manner disclosed in U.S. Pat. NO. 3,606,803. Frictional forces transmitted between friction discs 66 and 68 retard relative rotation between side gear 54 and casing 16. Since side gear 52 is connected with side gear 54 through pinion gears 56 and 58, relative rotation between side gear 52 and casing 16 is also retarded by engagement of main clutch assembly 26.

Figure 2:
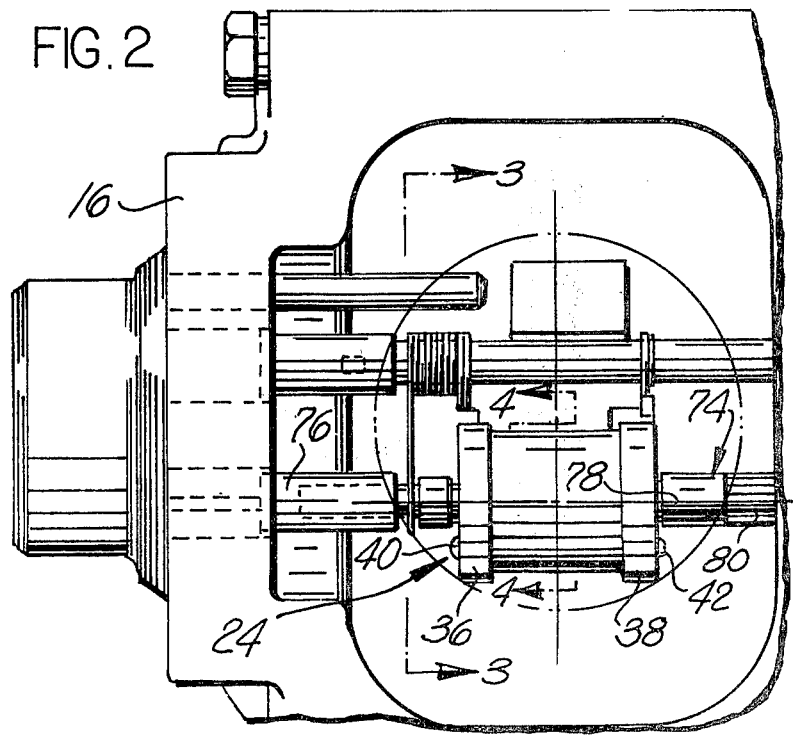
FIG. 2 is a partially broken away view of the differential drive mechanism of FIG. 1 and illustrating the construction of an actuator assembly for effecting operation of the clutch assembly to the engaged condition upon the occurrence of a predetermined rate of relative rotation between the driving and driven members.
Figure 3:
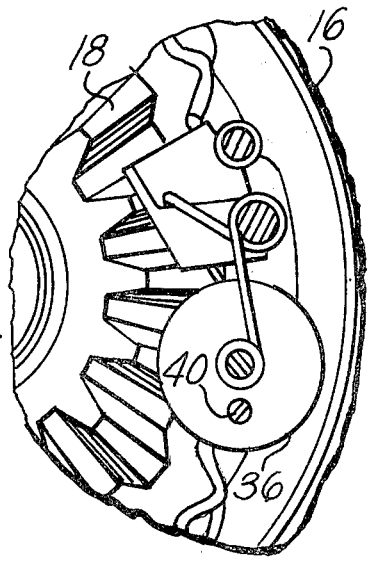
FIG. 3 is a fragmentary view, taken generally along the line 3—3 of FIG. 2, illustrating the relationship between the actuator assembly and a stop element utilized to retard rotation of an extended flyweight in the actuator assembly to thereby initiate engagement of the clutch assembly.

Actuator assembly 24 is effective to operate main clutch assembly 26 to the engaged condition upon the occurrence of a predetermined rate of relative rotation between one of the side gears 52 or 54 and casing 16. Actuator assembly 24 includes a drive arrangement 74 (FIG. 2) which effects rotation of flyweights 30 and 32 about a central axis 76 of actuator assembly 24 and an actuator shaft 78 (FIG. 2). Actuator shaft 78 is rotatably mounted in casing 16 and includes an annular array of gear teeth 80 which mesh with an annular array of gear teeth 82 (see FIG. 1) on wedge member 62.

When relative rotation occurs between side gear 54 and casing 16, actuator shaft 78 is rotated by gear teeth 82 causing rotation of stop members 36 and 38 through secondary clutches (not shown but of the same construction as the secondary clutches disclosed in U.S. Pat. No. 3,845,672). Since flyweights 30 and 32 are pivotally mounted on stop members 36 and 38, the flyweights are rotated about central axis 76 of actuator shaft 78 with the stop members at a speed which varies as a function of the speed of relative rotation between driving and driven members 18, 20 and 22.

As flyweights 30 and 32 are rotated about central axis 76 of the actuator shaft 78, flyweights 30 and 32 are subjected to a centrifugal force which varies as a function of variations in the rate of relative rotation between driving and driven members 18, 20 and 22. Upon rotation of actuator shaft 78 in a clockwise direction as viewed in FIG. 4, flyweight 30 is urged outwardly first due to inertia forces caused by acceleration from the retracted position shown in solid lines in FIG. 4 to the extended position shown in dashed lines in FIG. 4. Similarly, when actuator shaft 78 is rotated in a counterclockwise direction, flyweight 32 is urged outwardly first from the retracted position of FIG. 4 toward an extended position, corresponding to the extended position of flyweight 30. The centers of gravity of flyweights 30 and 32 are related to central axis 76 in the manner set forth in U.S. Pat. No. 3,606,803.

During clockwise rotation flyweight 30 is moved outwardly from the retracted position to the extended position to move a stop surface 96 on an outwardly projecting portion 98 of flyweight 30 into abutting engagement with a stop surface 102 on a stop element 104. Similarly, during counterclockwise rotation flyweight 32 is moved outwardly to move a stop surface 106 on an outwardly projecting portion 108 of flyweight 32 into abutting engagement with a second stop surface 110 on stop element 104.

Upon engagement of a stop surface on one flyweight 30 or 32 with stop element 104, the stop element retards rotation of actuator shaft 78. Since teeth 80 on actuator shaft 78 are in meshing engagement with teeth 82 on wedge member 62, rotation of wedge member 62 is also retarded. When rotation of wedge member 62 is retarded relative to side gear 54, the cam surface on side gear 54 presses wedge member 62 axially to engage main clutch assembly 26 and hold side gear 54 against rotation relative to casing 16.

Stop members 36 and 38 limit the outward movement of flyweights 30 and 32 under the influence of centrifugal force. Thus, arcuate surfaces 122 on opposite ends of flyweight 30 (see FIG. 4), move outwardly into engagement with annular stop surfaces 126 formed on the inside of stop members 36 and 38. Similarly, arcuate outer surfaces 128 on opposite ends of flyweight 32 move outwardly into engagement with stop surfaces 126 on stop members 36 and 38 upon movement of flyweight 32 from the retracted position to its extended position. The manner in which stop surfaces 122 and 128 on flyweights 30 and 32 cooperate with stop surfaces 126 formed on the inside of stop members 36 and 38 is the same as described in U.S. Pat. No. 3,845,672 and will not be further described herein to avoid prolixity of description.

A known differential drive mechanism having flyweights which are effective to initiate operation of a clutch assembly to an actuated condition is disclosed in U.S. Pat. No. 3,606,803. A flyweight 148 of the same general construction as the flyweights in this known differential drive mechanism is illustrated in FIG. 5. This flyweight includes a body portion 150 with a stop surface 152.

Upon movement of flyweight 148 of FIG. 5 from the retracted position as shown in solid lines to an extended position as shown in dash lines stop surface 152 moves outwardly. Although flyweight 148 moves through the same angular distance between the retracted and extended positions as flyweight 30 of FIG. 4, the stop surface 152 on flyweight 148 does not project outwardly from the center of actuator shaft 156 as far as the stop surface 96 on flyweight 30 projects outwardly from the associated actuator shaft 78.

Missed lock-ups of a differential are reduced by using the construction illustrated in FIG. 4 over the construction illustrated in FIG. 5. It is believed that the better performance of the actuator assembly shown in FIG. 4 results from the fact that stop surfaces 96 and 106 on flyweights 30 and 32 project outwardly a relatively large distance upon movement of the flyweights from the retracted position to the extended position.

Figure 6:
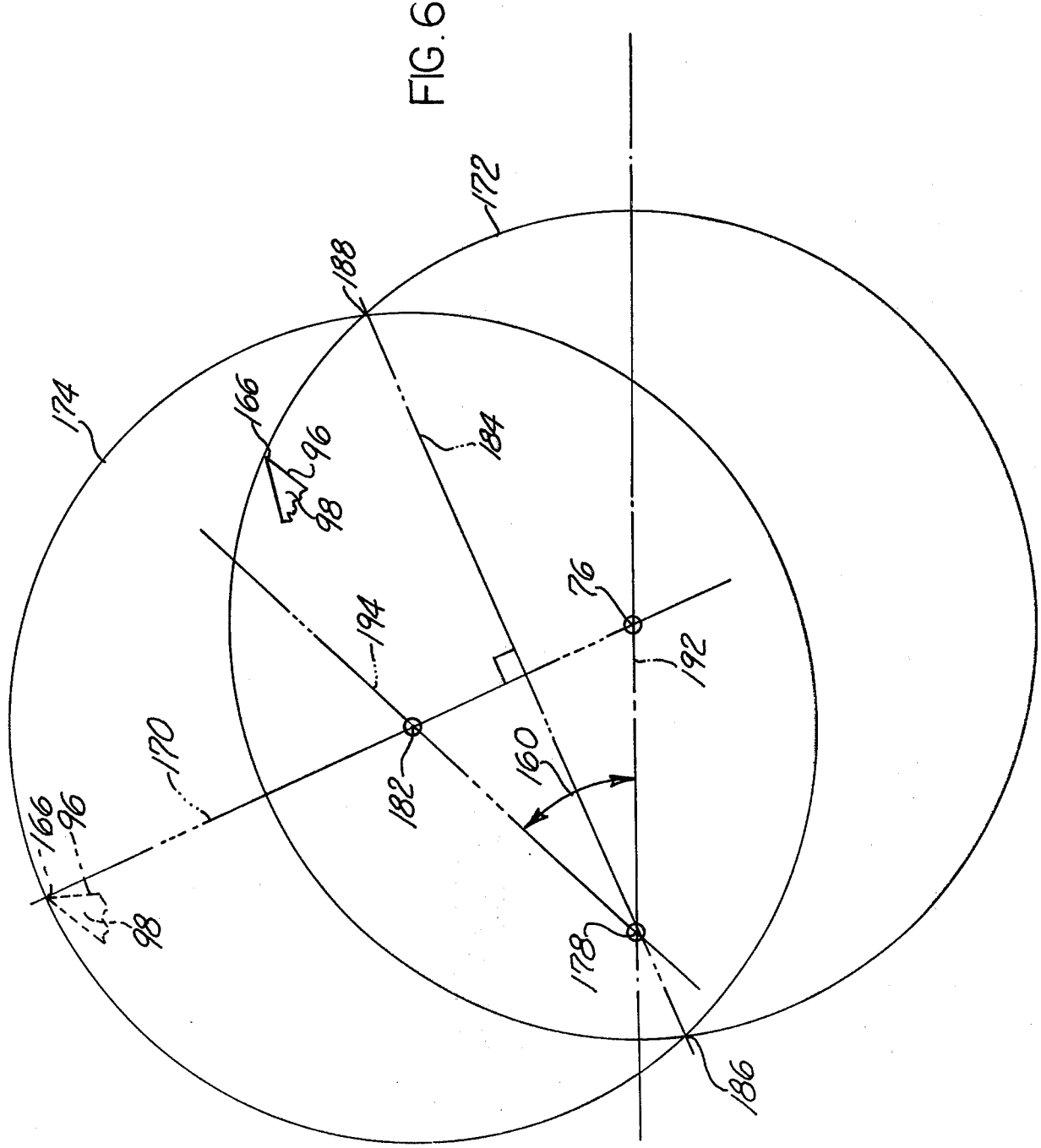
FIG. 6 is a schematic illustration depicting the relationship between a first imaginary circle which circumscribes the flyweights when they are in the retracted position and a second imaginary circle which circumscribes one of the flyweights when it is in its extended position.
Figure 7:
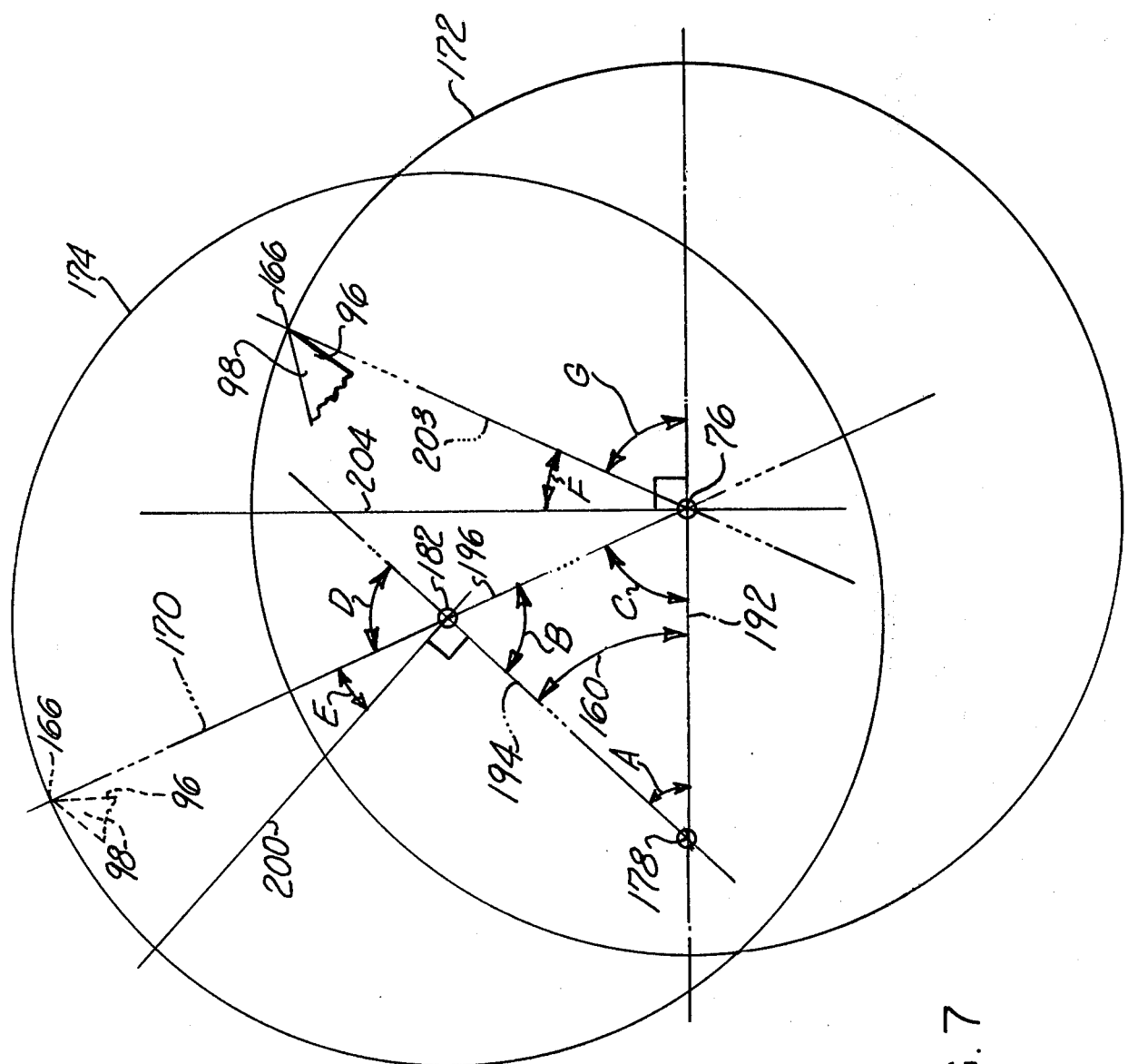
FIG. 7 is a schematic illustration, generally similar to FIG. 6, illustrating the relationship between the angle through which a flyweight is pivoted upon movement from the retracted position to the extended position and the location of the outermost end of a stop surface on the flyweight when the flyweight is in the extended position.

The manner in which stop surface 96 on flyweight 30 is extended outwardly for a relatively large distance, compared to the stop surface on flyweight 148 of FIG. 5, is illustrated schematically in FIGS. 6 and 7. For purposes of clarity in the description, it has been assumed in the illustrations of FIGS. 6 and 7 that as the flyweight moved from the retracted position to the extended position it moved through an angular distance, indicated as angle 160 in FIG. 6. The manner in which stop surface 96 is located in an optimum position on the arcuate body of the flyweight is the same regardless of the angular distance through which the flyweight moves between the retracted and extended positions. However, the actual location of the optimum position for the stop surface on the body of the flyweight will vary with the angular distance through which the flyweight is moved between the extended and retracted positions.

In FIG. 6, a first imaginary circle 172 is drawn with a center which is coincident with central axis 76 of the actuator assembly. The imaginary circle 172 extends through the outer end 166 of the stop surface 96 when the flyweight is in the retracted position.

Upon movement of the flyweight to the extended position in FIG. 6, it is pivoted about an axis 178 of support shaft 44. Outward pivotal movement of the flyweight is stopped by stop members 36 and 38 when the flyweight reaches the extended position. Imaginary circle 174 in FIG. 6 is drawn with the same diameter as imaginary circle 172 and has a center 182 which is located in the same position relative to the extended flyweight as is axis 76 of imaginary circle 172 located relative to the retracted flyweight. Stop surface 96 is located on the extended flyweight 30 so that end 166 intersects imaginary circle 174 at the intersection of a straight line of action 170 with imaginary circle 174. Line of action 170 extends through axis 76 and center 182 respectively of imaginary circles 172 and 174.

It can be shown that the point of intersection of end 166 with imaginary circle 174 is further from axis 76 than any other point on imaginary circle 174 for the given amount of extension of the flyweight. Therefore, if stop surface 96 was located so that end 166 intersected imaginary circle 174 at any position other than the position illustrated in FIG. 6, the distance which end 166 would project from axis 76 would be decreased. By locating the intersection of end 166 with imaginary circle 174 at the intersection of line 170, the distance which the stop surface projects outwardly has been maximized to thereby maximize the possibility of engagement of stop surface 96 with stop element 104 during rotation of the flyweight about axis 76.

The angular position of end 166 of a flyweight in a retracted position relative to axis 76 is measured by angle G as indicated in FIG. 7. Angle G may be determined in the following manner. An isoceles triangle is formed having a central angle A corresponding to angular distance 160 through which flyweight 30 is moved between the retracted and extended positions. Sides 192 and 194 of the triangle have a length equal to the distance between axes 76 and 178. Since the triangle is an isoceles triangle, the angles B and C between opposite sides 192 and 194 and the base 196 of the triangle are equal. Base 196 of the triangle is formed by a portion of line of action 170. The peak of the triangle is on axis 178.

Since the sum of angles A, B and C is equal to 180° and angles B and C are equal, angle B is equal to 90° minus one-half of angle A. Since angle D is on the opposite side of a pair of intersecting lines from angle B, angle D is equal to angle B. By erecting a line 200 which is perpendicular to side 194 and passes through center 182, it can be shown that angle E between lines 170 and 200 is equal to one-half of angle A.

It may easily be shown that angle E is equal to angle F which is defined between a line 203 extending through axis 76 and the intersection of end 166 with imaginary circle 172 and a line 204 which is perpendicular to side 192 of the isoceles triangle and passes through axis 76. Since angle F is equal to angle E or one-half the angle A, the remainder of the 90° between the line 204 and the extension of side 192 of the triangle, or angle G, is equal to 90° minus one-half of the angle A. Since the angle G may be determined for a given angle A of rotational movement of the flyweight, it is possible to determine the location of end 166 of stop surface 96 for a circle 172 of any given diameter.

Although in the embodiment of the invention illustrated in FIG. 4, flyweight 30 is disposed within imaginary circle 172 when the flyweight is in the retracted position and within imaginary circle 174 when the flyweight is in the extended position, the flyweight could be designed in such a manner that a portion of the flyweight would project slightly outwardly of the imaginary circles in either the retracted or extended positions. Further, axis 178 about which the flyweight is pivoted when it moves between the retracted and extended positions is illustrated as being within the imaginary circles 172 and 174 in FIGS. 6 and 7 as is the case in the embodiment of the invention illustrated in FIG. 4, however, under certain circumstances the axis about which the flyweights pivot could be coincident with the point of intersection of the two imaginary circles or even disposed outwardly of the two circles.

In view of the foregoing it can be seen that flyweight 30 has a configuration which maximizes the extent to which stop surface 96 on the flyweight projects outwardly from the central axis 76 about which the flyweight is rotated when it is in the extended position. Flyweight 32 has the same construction as flyweight 30. Therefore for an actuator assembly 24 of a given size when flyweights 30 and 32 are retracted and a given angle A between the retracted and extended positions, stop surface 96 on extended flyweight 30 projects as far out as possible from central axis 76 about which extended flyweight 30 is rotated. Of course, this promotes engagement of stop surface 96 on the extended flyweight 30 with stop element 104 and lock-up of differential 10.

Although the movement and construction of flyweight 30 has been more fully described than the movement and construction of flyweight 32, the two flyweights have the same movements and construction. However, flyweight 30 moves outwardly to the extended position first during clockwise rotation of the flyweights about axis 76 and flyweight 32 moves outwardly to the extended position first during counterclockwise rotation of the flyweights about axis 76. Of course, stop surface 106 is located on the arcuate body of flyweight 32 to maximize the distance which the outer end of the stop surface is located from axis 76 when flyweight 32 is in the extended position.

Having described one specific preferred embodiment of the invention, the following is claimed:

1. A drive mechanism for interconnecting rotatable driving and driven members, said drive mechanism comprising gear means for transmitting drive forces between the driving and driven members and for enabling relative rotation to occur between the driving and driven members, clutch means operable between an engaged condition in which said clutch means is effective to retard relative rotation between said driving and driven members and a disengaged condition, actuator means for effecting operation of said clutch means from the disengaged condition to the engaged condition, said actuator means including a flyweight having a stop surface with an outermost end, means for rotating said flyweight about a first axis, means for supporting said flyweight for pivotal movement about a second axis under the influence of centrifugal force, said flyweight being pivotal outwardly about said second axis from a retracted position to an extended position, means for blocking outward pivotal movement of said flyweight past said extended position, means for engaging said stop surface upon outward movement of said flyweight to the extended position, said flyweight being disposed at least partially within a first imaginary circle when said flyweight is in said retracted position and being disposed at least partially within a second imaginary circle when said flyweight is in said extended position, said first imaginary circle intersecting said outermost end of said stop surface and having a center which is disposed on said first axis when said flyweight is in said retracted position, said second imaginary circle having the same diameter as said first imaginary circle and having a center which is spaced apart from the center of said first imaginary circle, said second imaginary circle being disposed in the same position relative to said flyweight when said flyweight is in said extended position as is said first imaginary circle when said flyweight is in said retracted position so that said second imaginary circle intersects said outermost end of said stop surface when said flyweight is in said extended position, said outermost end of said stop surface intersecting said second imaginary circle at a point which is disposed further from said first axis than any other point on said second imaginary circle.

2. A drive mechanism as set forth in claim 1 wherein said flyweight is disposed entirely within said first imaginary circle when said flyweight is in said retracted position and is disposed entirely within said second imaginary circle when said flyweight is in said extended position.

3. A drive mechanism as set forth in claim 1 wherein said first and second axes are both disposed within said first and second imaginary circles.

4. A drive mechanism as set forth in claim 1 said flyweight includes a body having first and second end portions, said stop surface extending outwardly from said body at a location between said first and second end portions of said body, said first end portion of said body being intersected by said second axis.

5. A drive mechanism as set forth in claim 1 wherein said flyweight moves through a first angular distance about said second axis upon movement of said flyweight from said retracted position to said extended position, said intersection of said outermost end of said stop surface and said first imaginary circle being disposed along a first straight line which intersects said first axis when said flyweight is in said retracted position, said first straight line intersecting a second straight line which extends through said first and second axes, said first and second straight lines intersecting at an angle which is equal to ninety degrees minus one-half of said first angular distance.

6. A drive mechanism as set forth in claim 1 wherein said outermost end of said flyweight is disposed at an intersection of said second imaginary circle and a straight line which extends through the centers of said first and second imaginary circles when said flyweight is in said extended position.

7. A drive mechanism for interconnecting rotatable driving and driven members, said drive mechanism comprising gear means for transmitting drive forces between the driving and driven members and for enabling relative rotation to occur between the driving and driven members, clutch means operable between an engaged condition in which said clutch means is effective to retard relative rotation between said driving and driven members and a disengaged condition, actuator means for effecting operation of said clutch means from the disengaged condition to the engaged condition, said actuator means including a flyweight having a stop surface with an outermost end, means for rotating said flyweight about a first axis, means for supporting said flyweight for pivotal movement about a second axis under the influence of centrifugal force, said flyweight being pivotal outwardly about said second axis from a retracted position to an extended position, means for engaging said stop surface upon outward movement of said flyweight to the extended position, said flyweight being disposed at least partially within a first imaginary circle when said flyweight is in said retracted position and being disposed at least partially within a second imaginary circle when said flyweight is in said extended position, said first imaginary circle intersecting said outermost end of said stop surface and having a center which is disposed on said first axis when said flyweight is in said retracted position, said second imaginary circle having the same diameter as said first imaginary circle and having a center which is spaced apart from the center of said first imaginary circle, said second imaginary circle being disposed in the same position relative to said flyweight when said flyweight is in said extended position as is said first imaginary circle when said flyweight is in said retracted position so that said second imaginary circle intersects said outermost end of said stop surface when said flyweight is in said extended position, said outermost end of said stop surface being disposed at an intersection of said second imaginary circle and a straight line which extends through the centers of said first and second imaginary circles when said flyweight is in said extended position.

8. A drive mechanism as set forth in claim 7 wherein said flyweight moves through a first angular distance about said second axis upon movement of said flyweight from said retracted position to said extended position, said intersection of said outermost end of said stop surface and said first imaginary circle being disposed along a second straight line which intersects said first axis when said flyweight is in said retracted position, said second straight line intersecting a third straight line which extends through said first and second axes, said second and third straight lines intersecting at an angle which is equal to ninety degrees minus one-half of said first angular distance.

9. A drive mechanism as set forth in claim 7 wherein said first and second axes are disposed within said first and second imaginary circles.

10. A drive mechanism as set forth in claim 9 wherein said flyweight is disposed entirely within said first imaginary circle when said flyweight is in said retracted position and is disposed entirely within said second imaginary circle when said flyweight is in said extended position.

11. A drive mechanism as set forth in claim 10 wherein said flyweight includes a body having first and second end portions, said stop surface extends outwardly from said body at a location between said first and second end portions of said body, said first end portion of said body being intersected by said second axis.

12. A drive mechanism for interconnecting rotatable driving and driven members, said drive mechanism comprising gear means for transmitting drive forces between the driving and driven members and for enabling relative rotation to occur between the driving and driven members, clutch means operable between an engaged condition in which said clutch means is effective to retard relative rotation between said driving and driven members and a disengaged condition, actuator means for effecting operation of said clutch means from the disengaged condition to the engaged condition, said actuator means including a flyweight having a stop surface with an outermost end, means for rotating said flyweight about a first axis, means for supporting said flyweight for pivotal movement about a second axis under the influence of centrifugal force, said flyweight being pivotal outwardly through a first angular distance about said second axis from a retracted position to an extended position, means for blocking outward pivotal movement of said flyweight past said extended position, means for engaging said stop surface upon outward movement of said flyweight to the extended position, said outermost end of said stop surface being disposed along a first straight line which intersects the first axis when said flyweight is in said retracted position, said first straight line intersecting a second straight line which extends through said first and second axes, said first and second straight lines intersecting at an angle which is equal to ninety degrees minus one-half of said first angular distance.

13. A drive mechanism as set forth in claim 12 wherein said outermost end of said stop surface is disposed on a third straight line when said flyweight is in said extended position, said third straight line extending perpendicular to a fourth straight line which intersects said second straight line at an angle which is equal to one-half of said first angular distance.

14. A drive mechanism as set forth in claim 13 wherein said second and fourth straight lines intersect at said second axis.

15. A drive mechanism as set forth in claim 12 wherein said outermost end of said stop surface is disposed along a third straight line which intersects the first axis when said flyweight is in said extended position, said third straight line intersecting said second straight line at an angle which is equal to ninety degrees minus one-half of said first angular distance.

16. A drive mechanism for interconnecting rotatable driving and driven members, said drive mechanism comprising gear means for transmitting drive forces between the driving and driven members and for enabling relative rotation to occur between the driving and driven members, clutch means operable between an engaged condition in which said clutch means is effective to retard relative rotation between said driving and driven members and a disengaged condition, actuator means for effecting operation of said clutch means from the disengaged condition to the engaged condition, said actuator means including a flyweight having a stop surface with an outermost end, means for rotating said flyweight about a first axis, means for supporting said flyweight for pivotal movement about a second axis under the influence of centrifugal force, said flyweight being pivotal outwardly through a first angular distance about said second axis from a retracted position to an extended position, means for engaging said stop surface upon outward movement of said flyweight to the extended position, said outermost end of said stop surface being disposed along a first straight line which intersects the first axis when said flyweight is in said extended position, said first straight line intersecting a second straight line which extends through said first and second axes, said first and second straight lines intersecting at an angle which is equal to 90° minus one-half of said first angular distance.

* * * * *

UNITED STATES PATENT OFFICE
CERTIFICATE OF CORRECTION

Patent No. 3,985,045              Dated October 12, 1976

Inventor(s) John P. Shilling et al.

It is certified that error appears in the above-identified patent and that said Letters Patent are hereby corrected as shown below:

On the title page Item (75) the second inventor should read:

-- Derold J. Sherrill --.

Signed and Sealed this

Twenty-eighth Day of December 1976

[SEAL]

*Attest:*

RUTH C. MASON
*Attesting Officer*

C. MARSHALL DANN
*Commissioner of Patents and Trademarks*